United States Patent [19]

Cerf et al.

[11] 4,139,232
[45] Feb. 13, 1979

[54] DROP-IN RUMBLESEAT SYSTEM

[75] Inventors: Donald B. Cerf; Perry J. Dreibus, both of Los Angeles, Calif.

[73] Assignee: Rumble Seat Corporation of America, Los Angeles, Calif.

[21] Appl. No.: 819,270

[22] Filed: Jul. 27, 1977

[51] Int. Cl.$^2$ ............................................. B60N 1/10
[52] U.S. Cl. ...................................................... 296/66
[58] Field of Search ............... 296/63, 76, 66, 65 R, 296/137 B; 297/378

[56] References Cited

U.S. PATENT DOCUMENTS

| | | | |
|---|---|---|---|
| 1,796,081 | 3/1931 | Bundy | 296/66 |
| 2,043,804 | 6/1936 | Montgomery | 296/66 |
| 2,880,033 | 3/1959 | Shelton | 296/66 |
| 3,290,086 | 12/1966 | Petrak | 296/63 |
| 3,323,828 | 6/1967 | Esche | 296/63 |
| 3,413,031 | 11/1968 | Grofuert | 296/63 |
| 3,934,927 | 1/1976 | Zur | 296/69 |
| 3,954,296 | 5/1976 | Patnade | 296/137 B |
| 4,039,222 | 8/1977 | Wolf | 296/137 E |

Primary Examiner—Robert R. Song
Attorney, Agent, or Firm—Donald D. Mon

[57] ABSTRACT

A drop-in rumble seat system to fit in an aperture in the trunk lid of a vehicle. The aperture has a peripheral margin which is engaged by a peripheral frame that makes a watertight seal with it. The peripheral frame is supported by the trunk lid and in turn supports bearing means which depend beneath it in the trunk cavity. Hinge means is rotatably mounted to the bearing means, and a support member is mounted to the hinge means. The support member is adapted to assume a closed position where it closes the aperture, and an upright backrest position where it leaves the aperture open and is tilted relative to the frame to form a backrest. The hinge means is preferably a parallelogram type movement whose change in parallelogram configuration is controlled at various positions to provide necessary angular changes of position of the support member. The support means can be moved to its two positions by hand, or preferably by motor means.

23 Claims, 5 Drawing Figures

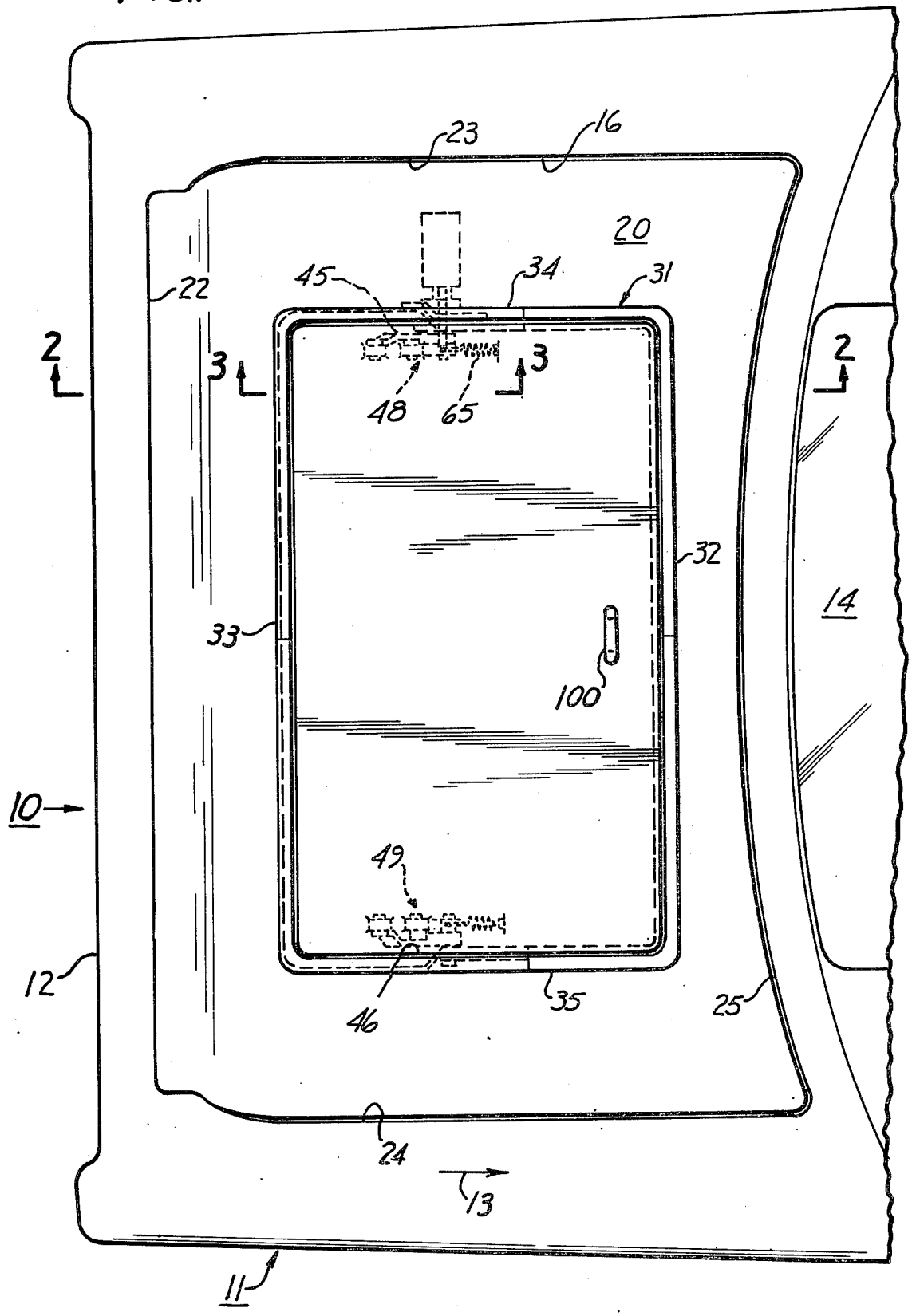

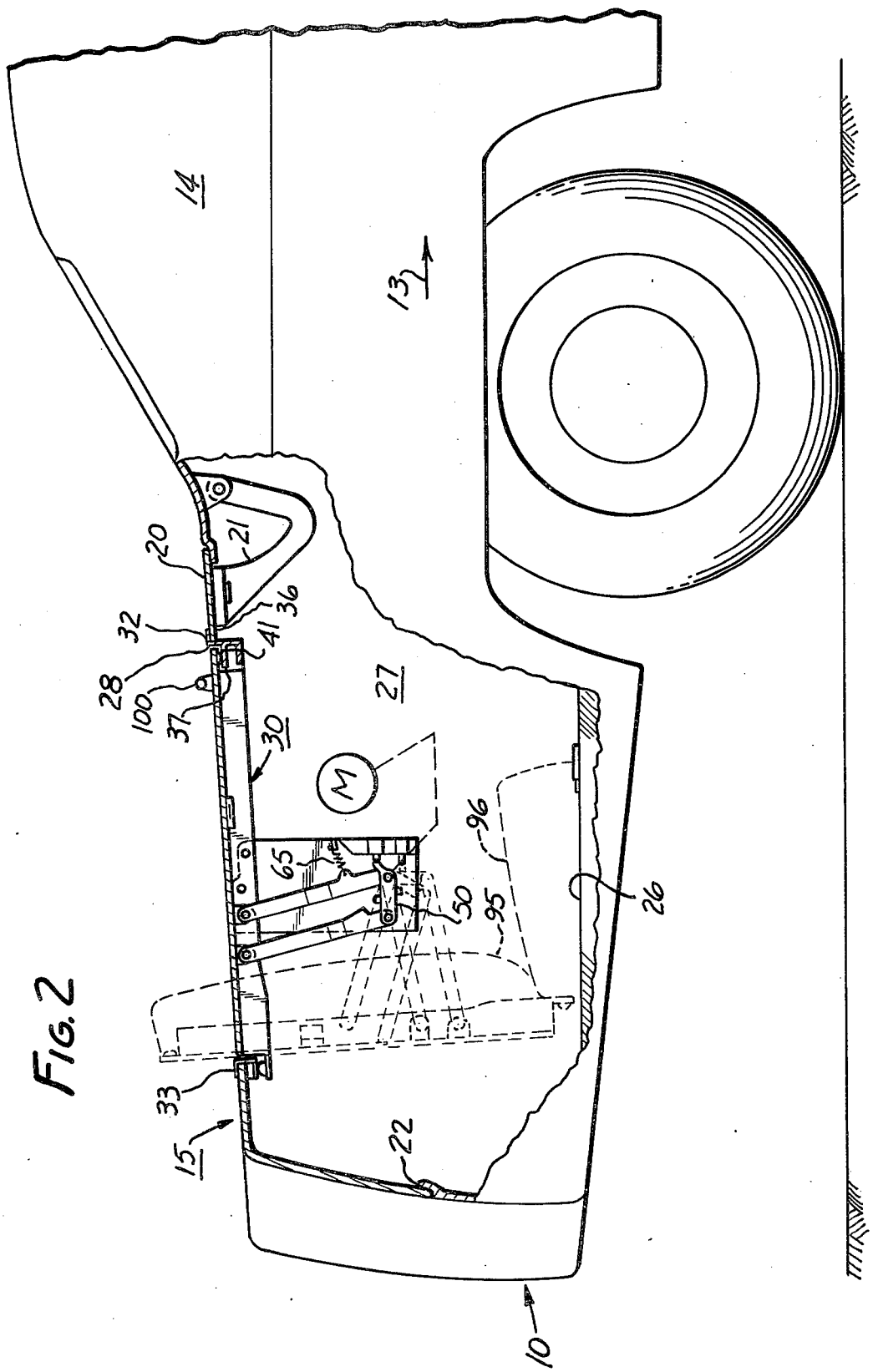

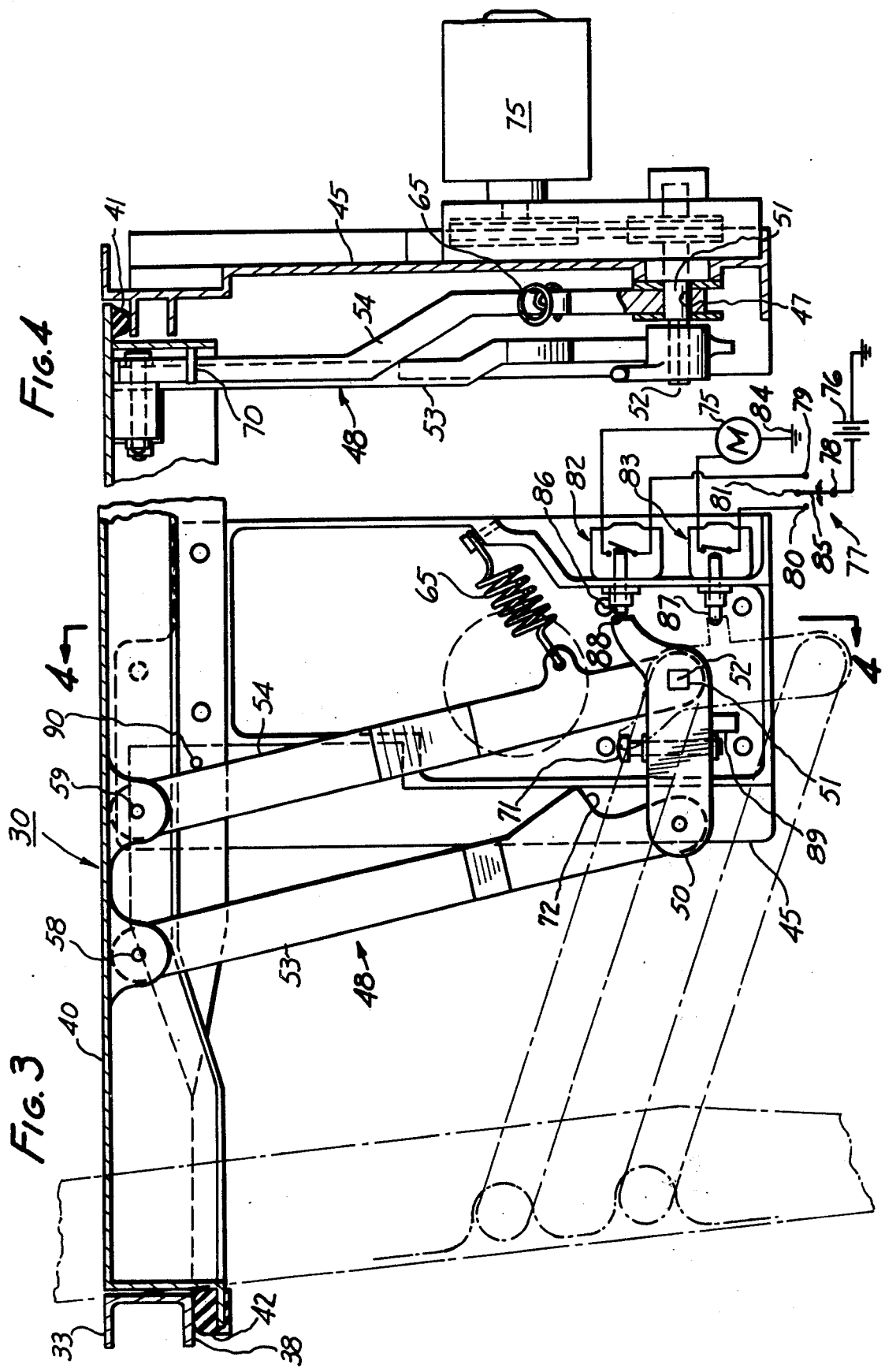

DROP-IN RUMBLESEAT SYSTEM

This invention relates to a drop-in rumble seat system which fits in an aperture of the trunk lid of a vehicle.

Rumble seats for vehicles are well-known. Early models were integrally built with the structure of the vehicle and have provided the backrest substantially as the lid of a rear compartment. The trunk was usually sacrificed. This is a suitable and well-known construction for a vehicle which is initially designed for the use of a rumble seat. However, modern vehicles customarily are not so designed, even though many owners wish they were. Known large automobiles, most modern Cadillacs for example, have substantial trunk areas which are sufficient for rumble seat usage. It is not to be expected that enough people would desire Cadillac sedans with rumble seats for production runs to be available. Therefore it is desirable to provide a means for converting the trunk lid of vehicles to a rumble seat configuration at least cost. It has previously been suggested that the trunk lid itself be replaced with another closure that is fitted with a rumble seat, thereby maintaining the same hinge system. This is a suitable way to provide a rumble seat, but it does require the removal, replacement and storage of the original trunk lid, and the provision of a substitute for the trunk lid, modified by a rumble seat. Many persons will regard the provision of a rumble seat as a suitable permanent modification of the vehicle particularly when the trunk lid hinge system itself remains useful, subject only of course to the occupation of some space by apparatus yet to be described, and this reduces storage requirements, and makes it unnecessary to remove and replace the trunk lid.

It is an object of this invention to provide a drop-in rumble seat system which can be placed in an aperture formed in the existing trunk lid of a vehicle, there to provided a rumble seat function. The system should be completely closeable when the rumble seat function is not desired and openable to provide the rumble seat. Further, the entire rumble seat system should track with the trunk lid so that with the exception of the seat cushion, which may be removed and replaced, much of the volume of the trunk cavity can be used as a trunk when the rumble seat is closed. The function of the trunk lid itself in opening, closing and locking is therefore not affected by this system. This rumble seat system is "drop-in" in the sense that it can be pre-assembled as a unit which can either be installed in one piece or assembled into a unit from sub-assemblies in the aperture, requiring no more modification to the trunk lid than the cutting of an aperture therein.

A drop-in rumble seat system according to this invention is intended to fit in the aperture in the trunk lid of a vehicle. This aperture has a peripheral margin. The system includes a peripheral frame which makes a watertight seal with the trunk lid and which is supported by the trunk lid at the peripheral margin. Bearing means is mounted to the frame and depends beneath the frame in the trunk cavity. Hinge means is rotatably mounted to the bearing means. A support member is mounted to the hinge means. The support member is adapted by the hinge means to assume a closed position where it closes the aperture, and a backrest position where it leaves the aperture open and is tilted relative to the frame to form a backrest. The support means can be manually movable, or preferably motor means can be provided for moving the hinge means, where by to move the support means to either one of the said positions.

According to a preferred but optional feature of the invention, the hinge means comprises a parallelogram movement which is driven by the motor means. This parallelogram movement has restraints on the change of its parallelogram configuration in order to guide the support member through certain angular motions.

The above and other features of this invention will be fully understood from the following detailed description and the accompanying drawings, in which:

FIG. 1 is a plan view of the presently preferred embodiment of the invention installed in the trunk lid of the vehicle;

FIG. 2 is a cross-section taken at line 2-2 in FIG. 1 showing the rumble seat system in two operative positions;

FIG. 3 is a fragmentary cross-section taken at line 3-3 in FIG. 2, providing an enlarged view of a portion of FIG. 2;

FIG. 4 is a righthand view taken at line 4-4 in FIG. 3; and

Figure 5:
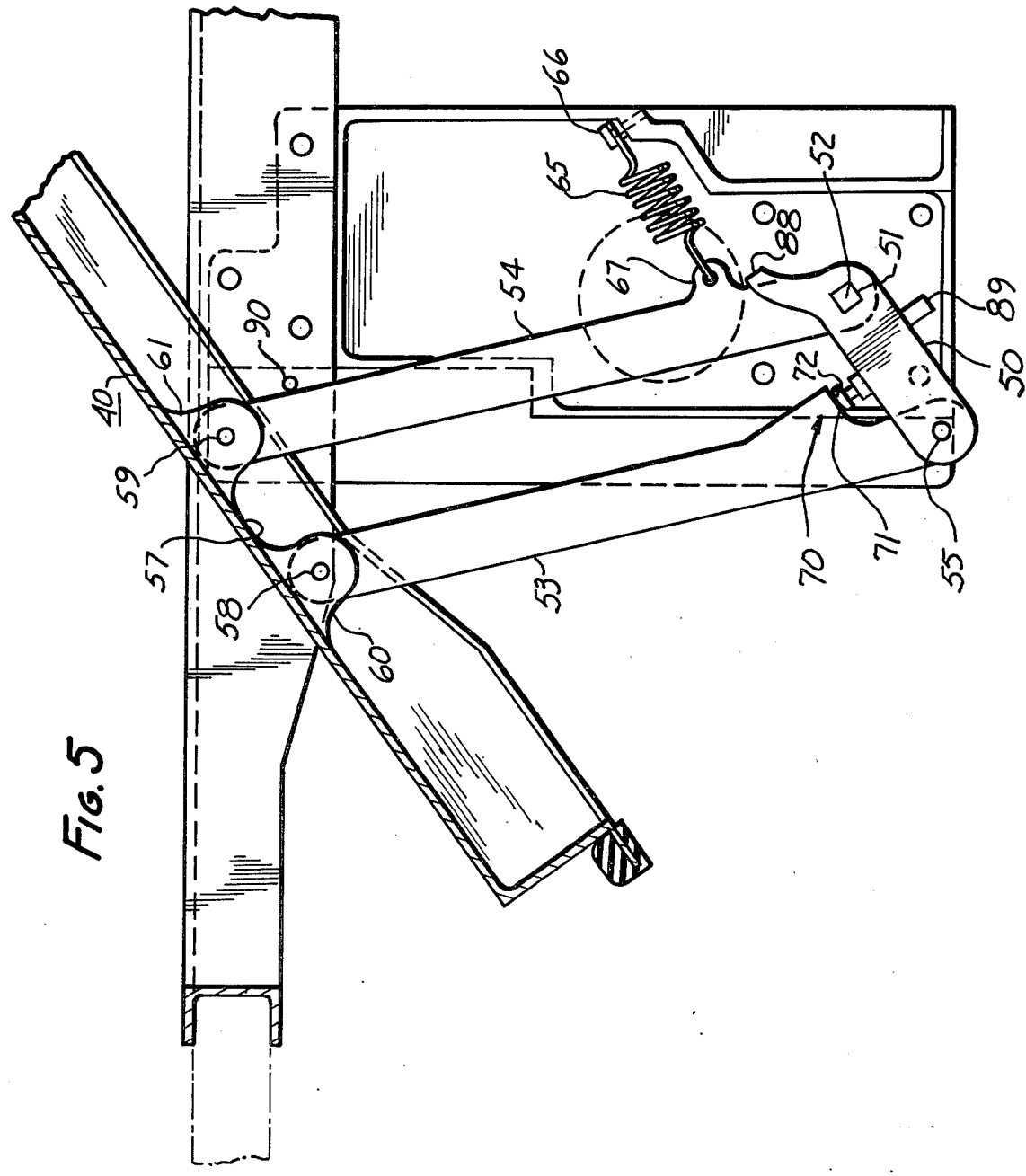
FIG. 5 is a view similar to FIG. 3 showing an intermediate parallelogram configuration of the hinge means.

In FIG. 1 there is shown the rear end 10 of a motor vehicle 11. The rear bumper 12 is shown. The forward direction 13 of the vehicle is indicated by an arrow. The passenger compartment 14 is shown. The vehicle is provided with a trunk section 15 with an opening 16 therein which is closed by a conventional trunk lid 20 that can tilt up and down around its hinges 21 (FIG. 2). It is held in the down and locked position by conventional lock means, not shown. As shown in FIG. 1 the lid makes a seal at ledge 22, and also at its sides 23, 24 and forward ledge 25. This is the conventional lid of an existing automobile which requires no further description here. The lid, together with sides and floor 26 forms a trunk cavity 27.

It is the objective of this invention to provide a rumble seat system which can readily be dropped into an aperture 28 formed in the trunk lid. It has a peripheral margin 29. This aperture is preferably made substantially rectangular, and can be cut by a common metal saw. Apertures of this type are regularly formed in roofs of vehicles for sun roofs and the like, and present no difficulty to the skilled mechanic.

The drop-in rumble seat system 30 is shown installed in aperture 28. As best shown in FIGS. 1 and 2, this system includes a peripheral frame 31 having forward and rearward edges 32, 33 and side edges 34, 35. These edges include a top flange 36 which overlays the peripheral margin 29 of the aperture.

Gasket material (not shown) may be placed between the top flange and the top of the peripheral margin to make a watertight seal therewith. Other sealant means may be provided instead. The frame includes at the forward portions of side edges 34 and 35 and along the forward edge 32 an upwardly facing ledge 37, and at the rearward portion of side edges 34 and 35 and beneath edge 33 a downwardly facing ledge 38. A support member 40 carries a gasket 41 or other seal at its forward portions facing downwardly toward the upwardly facing ledge and a gasket 42 facing upwardly at its rearward portions toward downwardly facing ledge 38. These gaskets and ledges 37 and 38 will provide a peripheral seal around the support member when the support member is in a "closed position" which is yet to be described.

A pair of bearing supports 45, 46 are provided, one at each side of the rumble seat system. Only one of these will be shown in detail in FIG. 2. The two supports are mirror images of one another. Therefore only bearing support 45 and its associated mechanisms will be described in detail. With the exception of certain elements which need be provided only once, the two supports are mirror images, one at each side of the rumble seat system.

The bearing support supports a bearing 47 to which hinge means 48 is mounted. Again, mirror image hinge means is provided at the other side of the rumble seat and for convenience are referred to by number 49 in FIG. 1.

The hinge means includes a drive link 50 which is mounted to a drive shaft 51 that is journaled in bearing 47. Therefore when drive shaft 51 is rotated, drive link 50 will be rotated. It rotates around center 52 of the shaft. The portion of the shaft engaging the drive link is preferably made square or otherwise non-circular in order that it can be mounted to the shaft and driven. Two parallel links 53, 54 are freely pivoted to the drive link at centers 55 and 52, respectively. The portion of drive shaft 51 to which parallel link 54 is journaled will be circular so that it can rotate freely relative to it and to the drive link. The term "parallel links" used for link 53 and 54 defines their substantial parallelism as part of a parallelogram type movement. They may of course differ from parallelism by a minor amount so long as it does not frustate the purpose of the hinge means.

A connecting link 57 (sometimes called a "fourth link") comprises structure between centers 58, 59 to which parallel links 53 and 54 are respectively pivotally joined. The support member itself may be considered the fourth link, because these centers are in fact mounted to journals 60, 61 that depend from the support member. However for hinge purposes, the connecting link may be regarded as the structural rigidity between centers 58 and 59 despite the fact that there may be no solid piece of rigid material directly connecting these two centers on a straight line. It will therefore be seen that centers 52, 55, 58 and 59 define the corners of a parallelogram movement and that rigid structure interconnects them. There is the capability of rotational movement between the members of the hinge means at these centers. The position of the drive link is uniquely determined by means yet to be described.

Bias means 65 comprising a coil spring has one end mounted to an anchor 66 on the bearing support, and the other to an anchor block 67 on the parallelogram link 54. The bias means tends to bias the parallel link in a forward direction.

Stop means 70 comprises a stop 71 on the drive link and a stop 72 on parallel link 53. Stop 71 may be a screw threaded device whose position relative to the drive length is adjustable. The stop means limits the closure of the angle formed between drive link 50 and parallel link 53.

Motor means 75 comprises a bi-directional electrical motor which receives its power from a grounded battery 76 through a three-position control switch 77. The switch has a common terminal 78, an up terminal 79, a down terminal 80 and an inactive terminal 81. Up limit switch 82 (normally closed) is connected to up terminal 79, and down level switch 83 (normally closed) is connected to down terminal 80. The limit switches in turn are connected to those portions of the motor which will cause it to operate the hinge means in a respective upward or downward direction (the directions of motor rotation being opposite), and the motor circuit is grounded at ground 84. Therefore, moving the switch blade 85 to contact one or the other of the up or down terminals, subject to control of the limit switches, causes operation of the motor to move the support member toward a closed position or toward a backrest position.

As best seen in FIGS. 2 and 3, the limit switches 82 and 83 have respective actuators 86, 87 which are adapted to be contacted by contactors 88, 89 carried by the drive link whereby to open the respective limit switches at the respective upper and lower limits of movement.

A limit stop 90 projects from the frame or other fixed structure so as to project into the path of parallel link 54. It limits the extent of forward movement of link 54.

A backrest cushion 95 is attached to the support member 40. A seat cushion 96 is placed on the floor and may either be more permanently attached by means of a nut and bolt arrangement, or may simply be spindled over a stud which permits readier removal. If spindled over a stud, the seat cushion may be removed when the rumble seat function is not desired.

A preferred means of attachment for the backrest cushion and the seat cushion to the respective support member or floor comprises a buckle and link arrangement of the type commonly used in seat belts, whereby one part carries a blade and the other a latch, and the parts may be slid into place and locked, and readily removed by the press of the conventional release button.

The installation and operation of this system will now be described. First and necessary aperture 28 is cut in the trunk lid, and the peripheral frame is then installed. It may be provided as an initially one-piece device. More usually it will be made in a plurality of sections which are joined at the installer's convenience. However, it will often be convenient to assemble the entire device outside and simply drop it in. However, the drop in feature is not a limitation on the invention because the system may just as well be assembled in place. It will still be within the scope of this invention. Once the system is installed and the electrical connections are made, it is ready for installation of the backrest cushion and the seat cushion. These may be attached as desired, preferably so as readily to be removable and replaceable. It will be observed, however, that the support member can be opened and closed both with and without a backrest cushion attached thereto.

The rumble seat, and especially the support member, is shown in solid line in FIG. 2 in the "closed position" and in dashed line in the "backrest position". It is the function of this system selectively to move the backrest support to either of these positions. Starting with the device in the closed position as best shown in FIG. 3, it will be noted that the up position limit switch 82 has been opened by contact with its respective contactor but that the down limit switch 83 is closed. These limit switches are both normally closed and are opened only by contact with their contactor. To begin the operation from the closed position to the backrest position, the switchblade is moved so as to contact the down terminal 80. This will provide current to the motor to drive it so as to move the support member toward the backrest position, the down limit switch 83 being closed. At this time, the bias spring holds the parallel link 54 against limit stop 90. Then, when the drive link is rotated counter-clockwise in FIG. 3, the initial rotation leaves parallel link in its forward position while the center 55 moves downwardly in an arc so as to pull link 53 downward thereby hinging the support member around center 59. This will tilt the support so that its rear edge will clear the rear edge of the frame. This movement will continue to about the position shown in FIG. 5, at which time stops 71 and 72 engage one another and there can be no further approach of the parallel links 53 and 54 toward one another. Now the further rotation of the drive link will carry the parallelogram linkage as shown against the bias of the bias spring as a locked parallelogram unit swinging the support member around center 52 until finally it reaches the backrest position in dash line in FIG. 2. At this time, and as shown in dashed line, the contactor 89 will have contacted actuator 87 of down position limit switch 83 to open the actuating circuit. Operation of the motor will stop even if the switch is held open. Now the rumble seat is ready for use.

When the rumble seat is to be closed, the switch blade is moved so that it contacts the up terminal 79. At this time the up limit switch 82 is closed. Now the hinge means swings upwardly as a locked parallelogram construction and continues to do so until the position of FIG. 5 is reached which is the position where the parallelogram link 53 again contacts limit stop 90. Now continuing rotation of the drive link will cause stops 71 and 72 to move apart from one another and the parallelogram links 53 and 54 to separate from one another while the support member moves through an arc around center 59 so as again to close the aperture at the frame.

The description of the parallelogram movement has been made in the specification and the claims with regard to a side view as taken in FIGS. 2, 3 and 5. An examination of FIG. 4 will show that they are in fact offset legs, but this does not affect the parallelogram operation of the device. The legs are offset as shown in order for the optimum journaling of the devices to be accomplished.

Only one drive link need actually be powered and that is the one on the left hand side of the vehicle looking in the forward direction. The drive links and other linkage on the right hand side are merely follower links which are not powered or equipped with limit stops. The two sets of hinges are connected merely by the structure of the support number. However their congruency assures that the support member will operate without cocking or jamming. Of course, two motors may be provided if desired but that is usually unnecessary. The motor can readily be placed to one side of the device as best shown in FIG. 4. If it is inconvenient to insert it through the aperture at the time the device is installed therein, it may be installed later.

It will further be noted that even with all this structure attached to the trunk lid, the trunk lid is fully actuable around its own hinge in accordance with its common and expected construction, and the trunk is useful as such.

The support member and the seat cushion and seat member are not connected to one another. The seat cushion can be removed when not desired.

It is also feasible to provide this rumble seat system for manual instead of motorized operation, or to be adaptable selectively for either. For manual operation, a handle 100 should be provided near the upper forward edge of the support member where it will be accessible whatever the position of the support member. Latch means (not shown) may be provided to hold the support member in the respective closed and backrest positions. The motor when used can provide this latching feature.

When the system is to be manual, the motor and the circuitry are deleted. The remainder of the system remains the same. When the usage is selectible, then clutch means or other disengagable means will be provided between the drive link and the motor so the motor can be disconnected for manual operation, or connected to the drive link for powered operation. The "drive" link is, of course, not driven by the motor when the device is operated manually, and the term "drive" is not intended to limit this link to a motor driven link, or one which necessarily drives the linkage. In fact, in manual operating, the drive link is passive—the operating forces are exerted on and through the fourth link by the support means.

This invention thereby provides an elegant means for installation of a rumble seat in a conventional trunk lid. It can operate between a closed and a backrest position, fully sealing the trunk in the closed position and providing a desirable rumble seat in the backrest position.

This invention is not to be limited by the embodiment shown in the drawings and described in the description, which is given by way of illustration and not of limitation, but only in accordance with the scope of the appended claims.

We claim:

1. A drop-in rumble seat system to fit in an aperture in the trunk lid of a vehicle, said aperture having a peripheral margin, said system comprising: a peripheral frame making a fluid seal with the trunk lid and being supported by said lid at the peripheral margin; bearing means mounted to and depending beneath said frame; hinge means rotatably mounted to said bearing means; a support member mounted to said hinge means, said support member being adapted to assume a closed position where it closes the aperture, and a backrest position where it leaves the aperture open and is tilted relative to the frame to form a backrest; said hinge means comprising a parallelogram structure which includes a drive link, two substantially parallel links, each pivotally mounted to the drive link at points spaced apart from one another, and a fourth link generally parallel to the drive link, and forming a rigid structure with the support member, the parallel links being pivotally mounted to the fourth link at points spaced from one another, the drive link being rotatably mounted to the bearing means, whereby the support member can be tiltably moved while in the aperture to clear the peripheral frame, and then rotated to the backrest position and the reverse.

2. A drop-in rumble seat according to claim 1 in which the trunk includes a floor, and in which seat means is attached to said floor forwardly of the support means when in its backrest position.

3. A drop-in rumble seat according to claim 2 in which the frame includes a sealing ledge, and in which when in a closed position, the support member bears against the top of the ledge at its forward edge, and against the bottom of the ledge at its rearward edge.

4. A drop-in rumble seat according to claim 2 in which said seat means is removably attached to the floor.

5. A drop-in rumble seat according to claim 2 in which releasable means removably attaches said seat means to the floor.

6. A drop-in rumble seat according to claim 1 in which handle means is carried by the support means for manual movement of the support means.

7. A drop-in rumble seat according to claim 1 in which bias means tends to bias the parallel links toward the closed position, and in which stop means on the drive link or fourth link and on one of said parallel links limits the approach of the parallel links toward one another.

8. A drop-in rumble seat according to claim 7 in which the drive link and one of the parallel links rotates around a common center.

9. A drop-in rumble seat according to claim 8 in which said stop means is formed on the drive link and the other of said parallel links.

10. A drop-in rumble seat according to claim 8 in which limit stop means is disposed on the peripheral frame in the path of one of the parallel links to limit the movement of said one of parallel links during a later portion of the travel of said support member from said backrest position toward said closed position.

11. A drop-in rumble seat according to claim 1 in which motor means is provided to move the support means to either one of said positions.

12. A drop-in rumble seat according to claim 11 in which said hinge means comprises a parallelogram structure which includes a drive link, two substantially parallel links, each pivotally mounted to the drive link at points spaced apart from one another, and a fourth link generally parallel to the drive link and forming a rigid structure with the support member, the parallel links being pivotally mounted to the fourth link at points spaced from one another, the drive link being rotatably mounted to the bearing means and being rotatably driven by the motor means, whereby the support member can be tiltably moved while in the aperture to clear the peripheral frame, and then rotated to the backrest position and the reverse.

13. A drop-in rumble seat according to claim 11 in which bias means tends to bias the parallel links toward the closed position, and in which stop means on the drive link or fourth link and on one of said parallel links limits the approach of the parallel links toward one another.

14. A drop-in rumble seat according to claim 13 in which the drive link and one of the parallel links rotates around a common center.

15. A drop-in rumble seat according to claim 14 in which said stop means is formed on the drive link and the other of said parallel links.

16. A drop-in rumble seat according to claim 14 in which limit stop means is disposed on the peripheral frame in the path of one of the parallel links to limit the movement of said one of the parallel links during a later portion of the travel of said support means from said backrest position toward said closed position.

17. A drop-in rumble seat according to claim 16 in which circuit means is provided to supply electric power to said motor means, and in which a first and second limit switch is included in said circuit means, and in which said limit switches are responsive to the position of the drive link when the support means is in the respective closed or backrest position.

18. A drop-in rumble seat according to claim 17 in which the frame includes a sealing ledge, and in which when in a closed position, the support member bears against the top of the ledge at its forward edge, and against the bottom of the ledge at its rearward edge.

19. A drop-in rumble seat according to claim 11 in which the frame includes a sealing ledge, and in which when in a closed position, the support member bears against the top of the ledge at its forward edge, and against the bottom of the ledge at its rearward edge.

20. A drop-in rumble seat according to claim 1 in which the frame includes a sealing ledge, and in which when in a closed position, the support member bears against the top of the ledge at its forward edge, and against the bottom of the ledge at its rearward edge.

21. A drop-in rumble seat according to claim 1 in which a backrest cushion is attached to said support means.

22. A drop-in rumble seat according to claim 21 in which said backrest cushion is releasably attached to said support means.

23. A drop-in rumble seat according to claim 22 in which releasable means attaches said seat means to said support means.

* * * * *